United States Patent [19]
Garnett

[11] Patent Number: 6,095,745
[45] Date of Patent: Aug. 1, 2000

[54] WHEEL LIFT CADDY

[76] Inventor: Winfield J. Garnett, 269 NW. 7th St., #417, Miami, Fla. 33136

[21] Appl. No.: 09/360,792

[22] Filed: Jul. 26, 1999

[51] Int. Cl.[7] .................................................. B60B 29/00
[52] U.S. Cl. ............................ 414/427; 29/822; 29/426.3; 414/428
[58] Field of Search ................... 29/426.3, 468, 29/822, 802, 281.4; 269/17, 58; 414/426, 427, 428

[56] References Cited

U.S. PATENT DOCUMENTS

| | | | |
|---|---|---|---|
| 3,653,527 | 4/1972 | Seymour | 214/331 |
| 3,850,321 | 11/1974 | Virnig | 214/331 |
| 4,123,038 | 10/1978 | Meyers | 254/2 |
| 4,771,531 | 9/1988 | Asher | 29/426.3 |
| 5,362,194 | 11/1994 | Kassebaum | 414/427 |

*Primary Examiner*—Irene Cuda
*Assistant Examiner*—Anthony L. Green
*Attorney, Agent, or Firm*—Robert J. Van Der Wall

[57] ABSTRACT

A caddy apparatus for lifting and carrying a vehicle tire includes a cart frame and a wheel maneuvering structure having a tilt frame and lift carriage slideably mounted on the tilt frame; a pivot mounting of the tilt frame on the cart frame; a tire lift carriage slideably mounted to the tilt frame of the wheel maneuvering structure for engaging and retaining a vehicle tire; and a tire lift carriage lifting and lowering mechanism, preferably employing a hydraulic pump and cylinder.

10 Claims, 5 Drawing Sheets

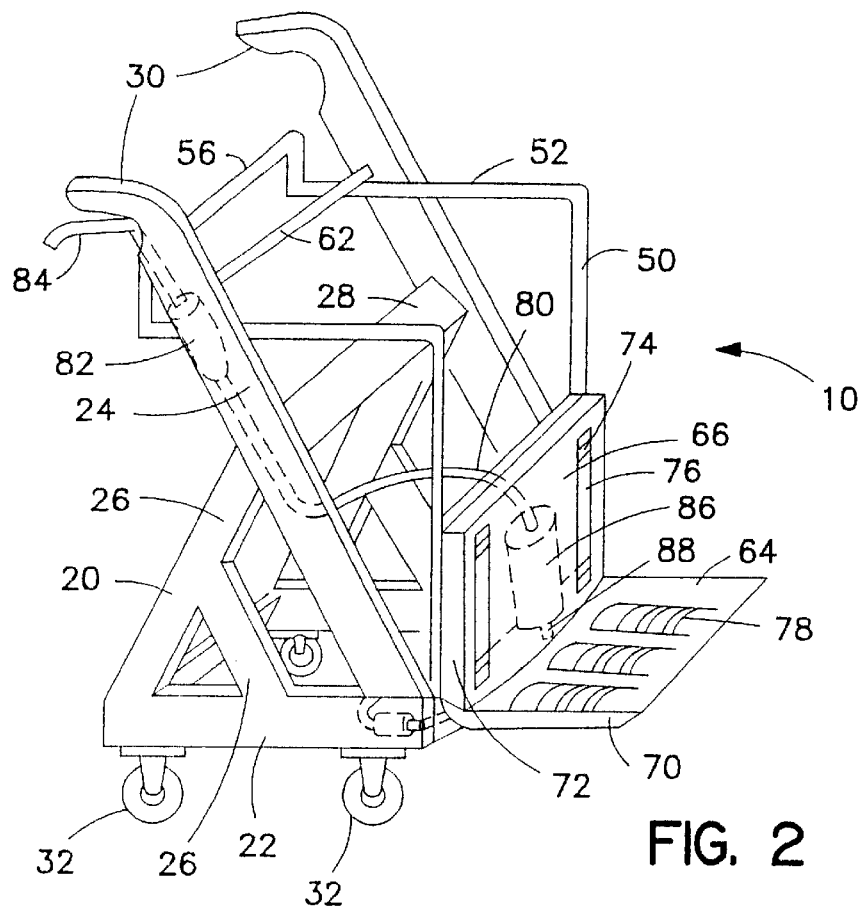
FIG. 2
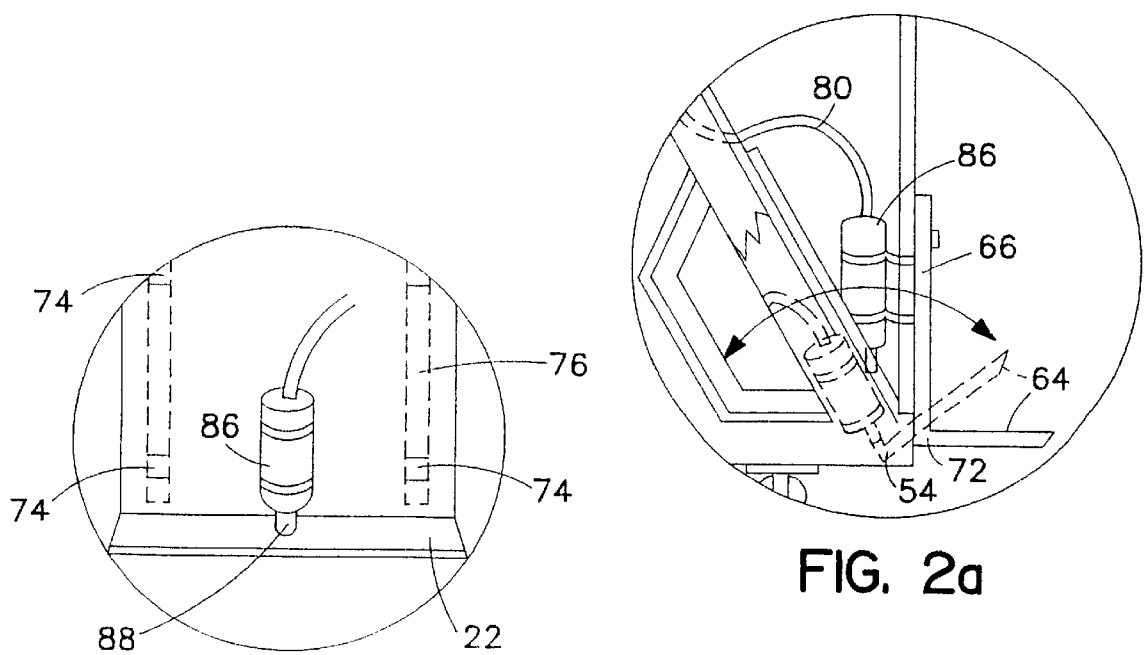
FIG. 3
FIG. 2a

WHEEL LIFT CADDY

BACKGROUND OF THE INVENTION

1. Field of the Invention

The present invention relates generally to the field of motor vehicle servicing and repair equipment. More specifically the present invention relates to a caddy apparatus for lifting and carrying vehicle wheels and tires, particularly bus and truck tires, typically while the tires are mounted on wheels. The apparatus includes a cart frame and a wheel maneuvering structure pivotally mounted to the cart frame to pivot from a canted position to a substantially vertical position and vice versa. The wheel maneuvering structure includes a hydraulically operated tire lift carriage.

The cart frame is preferably constructed of metal structural members forming a horizonal frame base on wheels and forming handle members extending upwardly and rearwardly from either side of the frame base. The handle members are conveniently placed to the left and right of the user. The wheel maneuvering structure includes a tilt frame pivotally mounted at the front of the frame base. The tilt frame extends vertically upward such that it raises a wheel center to a height exceeding the height of an ordinary bus (or truck) axle while the bus is elevated by a jack. The tilt frame includes a cross bar handle to move the tilt frame from a substantially vertical orientation to a canted position established by a stop bar attached between the handle members. The tire lift carriage is slideably engaged with regard to the tilt frame, preferably under hydraulic power.

2. Description of the Prior Art

There have long been jacks for lifting tires and wheels off and onto truck and bus hubs. These jacks have generally taken the form of wheeled carts having upright wheel gripping structures and hydraulic lifting means. A problem with these prior jacks has been that no provision is made to pivot the tire away from the hub and inside the perimeter of the cart wheels for enhanced stability.

Hendry, U.S. Pat. No. 1,964,119, issued on Jun. 26, 1934, discloses a portable tire lifting apparatus. Hendry includes an A-shaped horizontal base structure on wheels, an upright guide member, and a tubular carriage member slidingly fit around the guide member and fitted with an opposing pair of laterally extending tire gripping arms. The arms pivot relative to the upright guide member, and hydraulic lift apparatus are provided to raise the arms to engage a tire and to lower the arms and the tire. A problem with Hendry is that no means provided for a user to conveniently hold, grip and maneuver the lifting apparatus. Another problem is that the overall apparatus structure is too light and frail to reliably carry dual wheels with tires at one time. Still another problem with Hendry is that arm pivoting is possible only upwardly and downwardly, and no provision is made for pivoting the tire back and away from the wheel hub.

Asher, U.S. Pat. No. 4,771,531, issued on Sep. 20, 1988, reveals a device for lifting vehicle wheels essentially similar to that of Hendry, and presenting the same general problems.

Gemmill, U.S. Pat. No. 2,217,898, issued on Oct. 15, 1940, reveals a portable lifting apparatus. Gemmill includes a U-shaped base frame on wheels, two stantions extending upright from the base frame, a wheeled jack with an upright elevation screw removably and supportingly coupled to the base frame, and a U-shaped tire engaging structure slidably mounted on the upright stantions. The elevation screw extends engagingly through a threaded port in the tire engaging structure. Rotation of a handle on the wheeled jack rotates the elevation screw to raise and lower the tire engaging structure and any tires it retains. A problem with Gemmill is that no provision is made to pivot the tire and wheel back and away from the wheel hub.

Flanders, U.S. Pat. No. Des. 266,368, issued on Sep. 28, 1982, teaches a log cart. The Flanders cart includes an L-shaped cart frame mounted on an axle with a wheel at each end, the frame having a forwardly extending lower frame portion for supporting a log and an upwardly extending handle portion. A U-shaped log holding cradle is secured onto the lower frame portion to retain a log against rolling off the cart. Problems with Flanders, if used for lifting a truck or bus tire, are that no provision is made to elevate the lower frame portion to the level of the tire, no provision is made to reliably engage the tire or to offset the rotational torque about the axle caused by the substantial weight of the tire and wheel.

Laaksonen, U.S. Pat. No. 5,464,314, issued on Nov. 7, 1995, discloses a device for handling a vehicle wheel. Laaksonen includes a vertically movable frame portion, and gripping elements connected to the frame portion for gripping the vehicle wheel and lifting or otherwise displacing the wheel from the shaft or back onto the shaft the gripping elements. The gripping elements include two or more support members arranged to be fitted into a groove in the disc of the wheel to be handled. Problems with Laaksonen are that no provision is made for conveniently pivoting the tire and wheel back from the hub, or for gripping the apparatus and pushing and pulling the apparatus and an engaged wheel to a desired location.

Seymour, U.S. Pat. No. 3,653,527, issued on Apr. 4, 1972, teaches a vehicle wheel dolly. Seymour includes a linkage system for gripping a wheel between the wheel rim and tire periphery at the upper side of the wheel, and thereafter lifting the wheel by force applied to the gripped portion of the wheel, and thereafter lifting the wheel by force applied to the gripped portion of the wheel to release it from the axle. A hydraulic ram applies an upward thrust to the linkage to first grip and then to raise the wheel. A problem with Seymour is that only two dolly wheels support the dolly and a heavy truck tire. As a result, the user must apply lifting force to the dolly to raise the rearward end off the ground so that the dolly can roll without dragging, and rolling the loaded dolly any significant distance or rolling it repeatedly becomes taxing.

It is thus a principal object of the present invention to provide a truck tire caddy apparatus which lifts, lowers and fully supports the wheel and tire during movement of the apparatus and wheel and tire between initial and final locations.

It is another object of the present invention to provide such an apparatus which can pivot the truck tire and wheel back and away from, and toward and onto, an axle.

A further object of the present invention to provide such an apparatus which is easily gripped and steered by a user during tire engagement and apparatus movement and simple to operate.

An additional object of the invention is to provide an apparatus that facilitates accurate alignment of a wheel with an axle to make it easy to mount heavy wheels and tires.

Another object of the present invention to provide such an apparatus which is sturdy, can carry several tires including dual wheels at once, and is relatively inexpensive to manufacture.

SUMMARY OF THE INVENTION

The present invention accomplishes the above-stated objectives, as well as others, as may be determined by a fair reading and interpretation of the entire specification.

A caddy apparatus is provided for lifting and carrying a vehicle tire, including a cart frame, a wheel maneuvering structure pivotally mounted to the cart frame to pivot from a canted position to a substantially vertical position and vice versa. The wheel maneuvering structure includes a hydraulically operated tire lift carriage. The cart frame includes a horizonal frame base on wheels and handle members extending upwardly and rearwardly from either side of the frame base. The apparatus preferably further includes first and second frame trusses extending between the frame base and each handle member and a cross strut interconnecting the handle members midway along their length. The wheel maneuvering structure includes a tilt frame pivotally mounted at the front of the frame base. The tilt frame extends vertically upward such that it raises a wheel center to a height exceeding the height of an ordinary bus (or truck) axle while the vehicle is elevated by a jack. The tilt frame includes a cross bar handle to move the tilt frame from a substantially vertical orientation to a canted position established by a stop bar attached between the handle members. The tire lift carriage is slideably engaged with regard to the tilt frame, preferably under hydraulic power.

BRIEF DESCRIPTION OF THE DRAWINGS

Various other objects, advantages, and features of the invention will become apparent to those skilled in the art from the following discussion taken in conjunction with the following drawings, in which:

FIG. 2 is a perspective view of the apparatus with the tire maneuvering structure pivoted to a substantially vertical position.

FIG. 2a is a fragmentary side view of the apparatus showing the wheel maneuvering structure pivoted forwardly to reveal the hydraulic cylinder on the tire lift carriage and showing the canted position in phantom.

FIG. 3 is a fragmentary rear view of the tire lift carriage showing once again the hydraulic cylinder and its piston attached to the frame base.

DETAILED DESCRIPTION OF THE PREFERRED EMBODIMENTS

Figure 1:
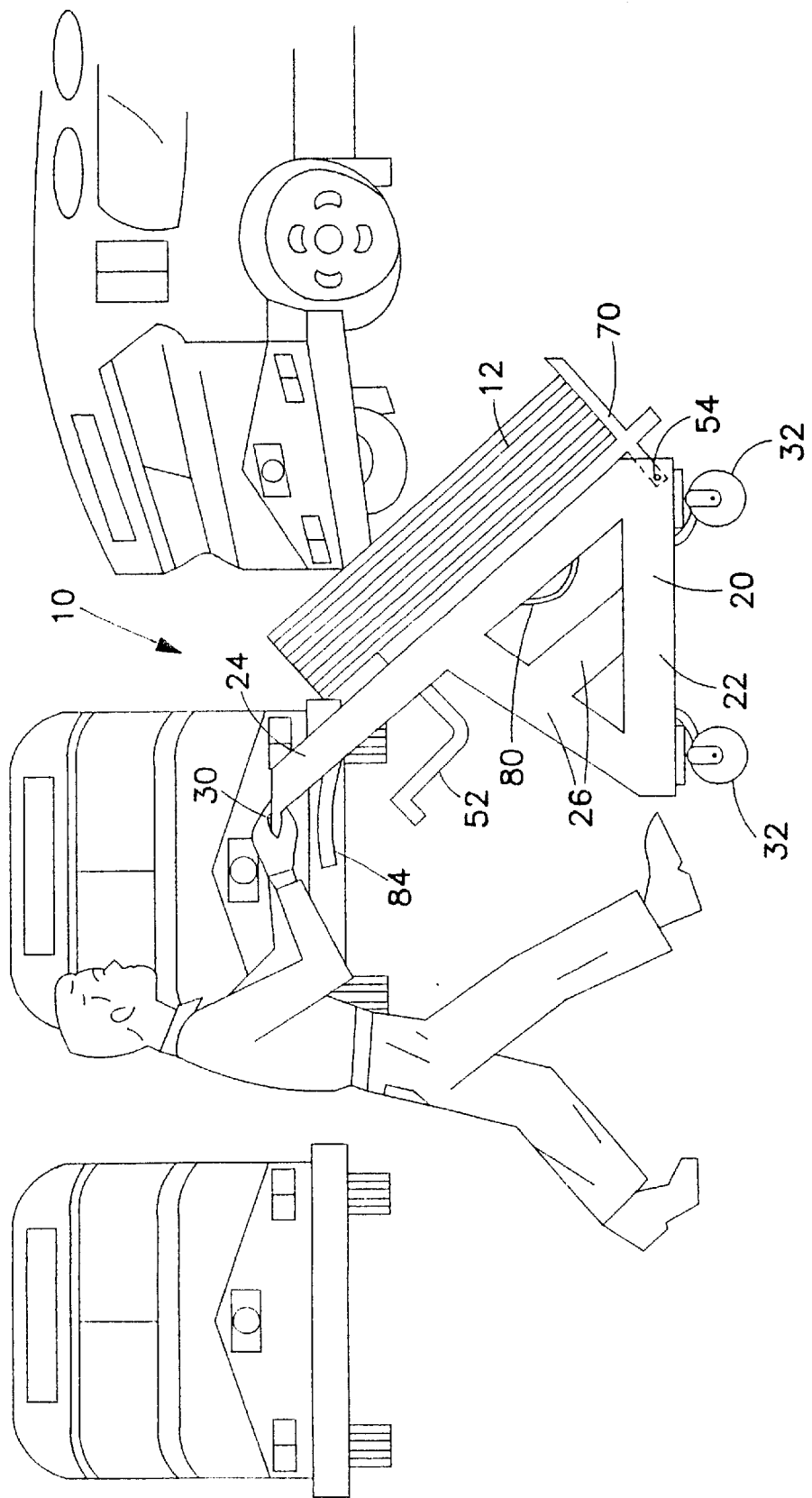
FIG. 1 is a side view of the preferred embodiment of the caddy apparatus holding a bus tire in a canted position and being pushed by a user.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

First Preferred Embodiment

Figure 4:
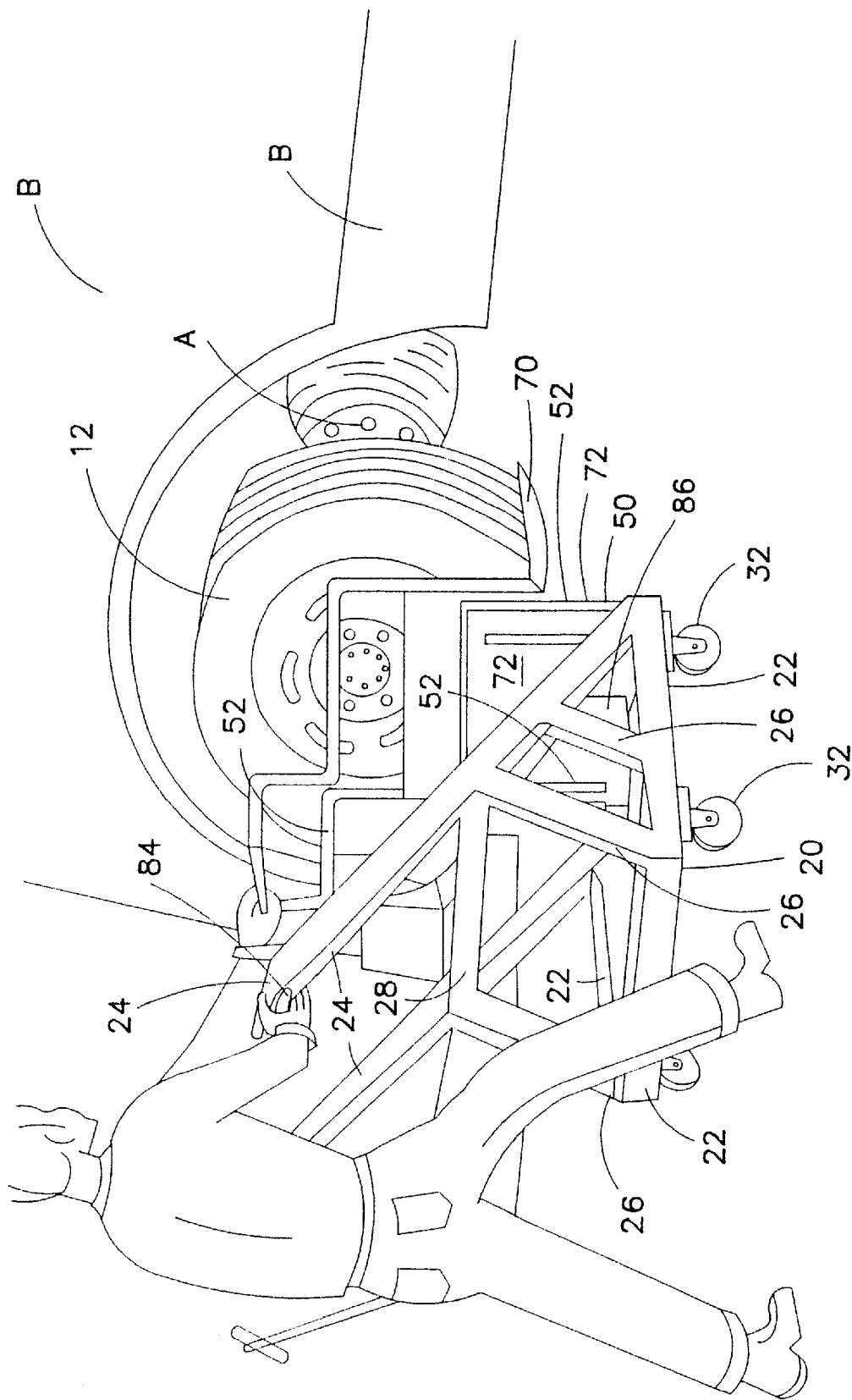
FIG. 4 is a perspective view of the apparatus being used to support and either mount or dismount a vehicle tire on an axle.
Figure 5:
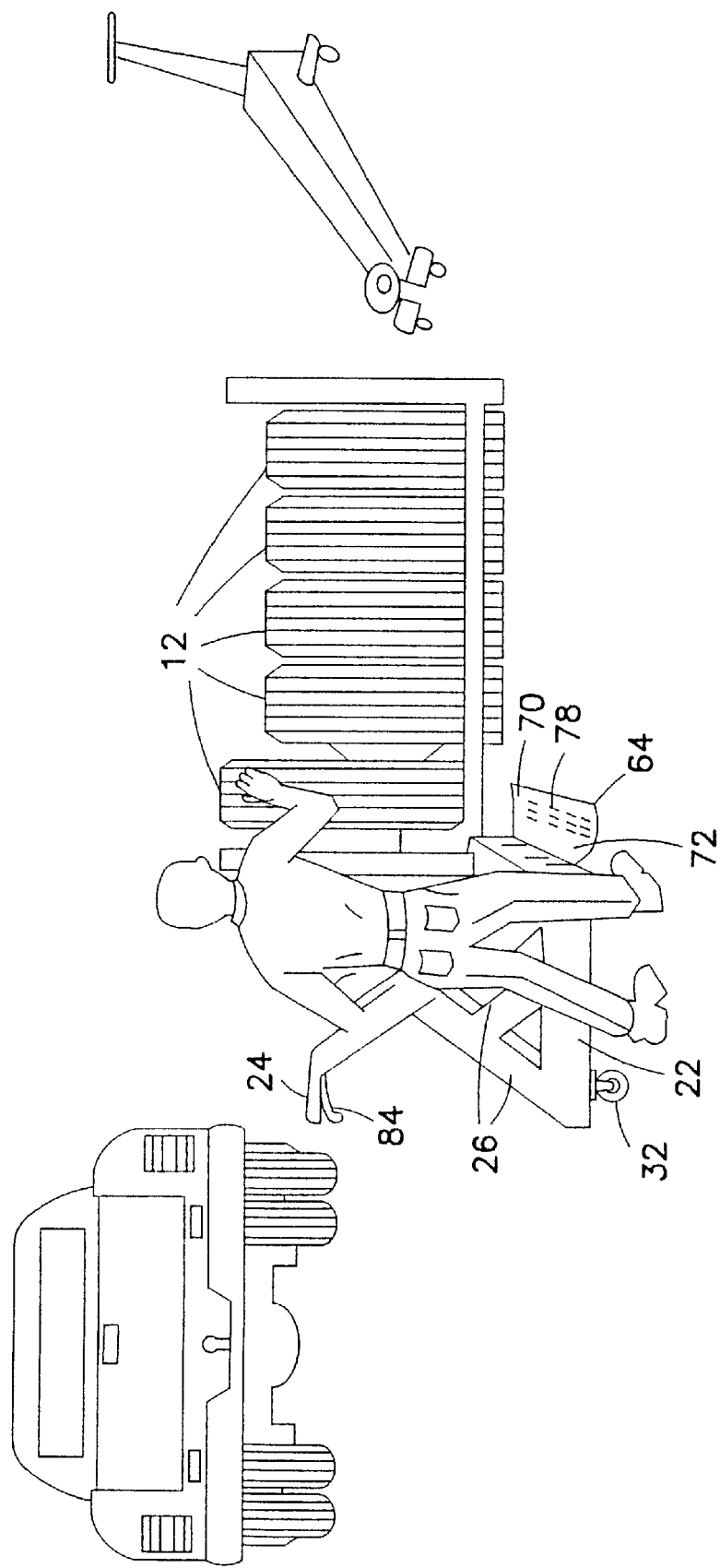
FIG. 5 is side view of the apparatus poised to receive one of a series of truck tires loaded into a tire rack.
Figure 6:
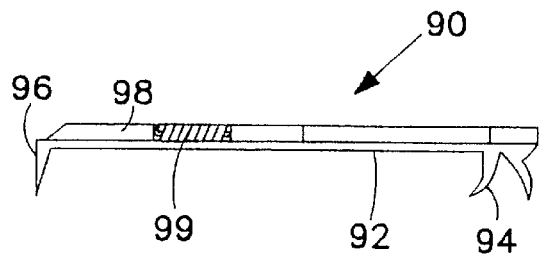
FIG. 6 is a side view of the separate single wheel divorcing tool which is optionally provided with the apparatus.
Figure 7:
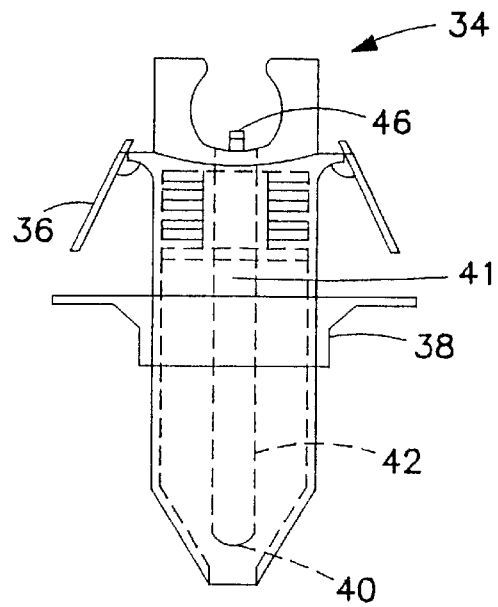
FIG. 7 is an enlarged front elevation view of the separate dual wheel divorcing tool which is optionally provided with the apparatus.
Figure 8:
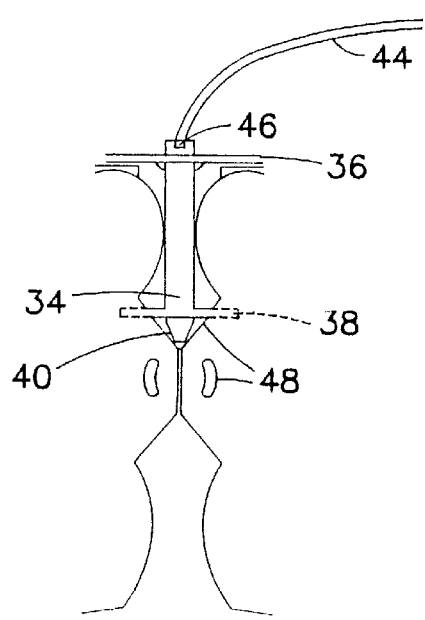
FIG. 8 is a front elevation view of the separate dual wheel divorcing tool deployed between and engaged with a dual wheel set just prior to use.

Referring to FIGS. 1–8, a caddy apparatus 10 for lifting and carrying heavy bus and truck tires 12 is disclosed. Apparatus 10 includes a cart frame 20 connected to a pivoting wheel maneuvering structure 50 having a hydraulically operated lift carriage 72.

Cart frame 20 is constructed of metal structural members forming a square horizonal frame base 22, handle members 24 extending upwardly and rearwardly from either side of frame base 22, first and second frame trusses 26 extending upwardly from frame base 22 to each handle member 24, and a cross strut 28 interconnecting the handle members 24 midway along their length. The frame base 22 is supported on four bearing mounted cart frame wheels 32, two of which are pivotally mounted to facilitate steering the apparatus 10.

Wheel maneuvering structure 50 includes a tilt frame 52 pivotally mounted to a tilt frame pivot bar 54 connected to the front of the frame base 22. Tilt frame 52 extends vertically upward such that it raises a wheel center to a height exceeding the height of an ordinary bus B (or truck) axle A while the bus B is elevated by a jack. Tilt frame 52 also includes tilt frame cross bar handle 56. A stop bar 62 interconnects handle members 24 above horizontal segments of tilt frame 52 and forward of tilt frame cross bar handle 56, so that wheel maneuvering structure 50 pivots forwardly only to a substantially vertical orientation established by the point of contact between tilt frame 52 and stop bar 62. The lift carriage 72 is preferably a combination of a substantially horizontal carriage shelf 64 and an upright carriage back plate 66. Carriage back plate 66 includes back plate slots 76 to horizontally position lift carriage 72 using slot roller pins 74 which are attached to tilt frame 52. This allows vertical motion of the lift carriage 72 because of the sliding relationship between back plate slots 76 and slot roller pins 74.

A hydraulic lifting system includes a hydraulic pump 82 attached to one of the handle members 24, a resiliently biased pump lever 84 pivotally mounted in proximity to or beneath its supporting handle member 24 handle grip 30 for squeezing repeatedly toward handle grip 30 to operate hydraulic pump 82. Hydraulic pump 82 is in pressurized fluid communication with a hydraulic cylinder 86 through hydraulic hose 80. Hydraulic cylinder 86 is attached to the rear of carriage back plate 66. Hydraulic cylinder 86 operates piston rod 88 which protrudes downwardly out of hydraulic cylinder 86 and is pivotally attached to frame base 22, so that operation of hydraulic pump 82 causes the piston rod 88 to bear against frame base 22 and progressively elevate tire lift carriage 72 relative to frame base 22, and release of the fluid back into a reservoir (not shown) through operation of a valve (not shown) permits the tire lift carriage 72 to lower by the force of its own weight. The horizontal carriage shelf 64 includes roller bearings 78 to facilitate sliding the wheel and tire 12 smoothly onto axle A and shelf lips 70 at lateral edges of shelf 64 to keep tires and wheel from rolling off the edges of shelf 64 when the apparatus is moved or placed on a less than substantially horizontal surface.

A separate single wheel divorcer tool 90 is provided for breaking a single wheel free from the brake drum on the axle A. See FIG. 6. Tool 90 includes a tube 92 which is preferably one and one half inches in diameter, a trigger 94, wheel hook 96 and has a pneumatic port at trigger end of tube 92 to feed pressurized air to resiliently biased solid steel ramming piston 98. The resilient bias is preferably a coil spring 99. The wheel hook 96 abuts and engages a vehicle wheel. Ramming piston 98 is slidably disposed in tube 92 and is movable longitudinally relative to wheel hook 96 to separate the wheel from the brake drum and axle.

For a dual wheel rig, a dual wheel divorcer tool 34 is also provided which is similarly operated by connection to a pressurized air source in the form of pressure hose 44 connected to a valve 46. The dual wheel divorcer tool 34 is used for breaking dual wheels free from each other since they frequently rust together. See FIGS. 7 and 8. Tool 34 includes a foldable stabilizer 36 and a rotatable support bar 38. The foldable stabilizer rests on the top of the tires to maintain vertical orientation of the tool 34 in use. The rotatable support bar 38 is pivoted between the wheels to interlock with apertures 48 in both of the dual wheels to provide a support platform when the dual wheel divorcer tool 34 is fired. The dual wheel divorcer tool 38 further includes a resiliently biased impulse piston 42, the end of which is formed into chisel member 40. The resilient bias is preferably a coil spring 41 to retract the impulse piston 42 and chisel member 40 each time it is fired. In practice, the tool 34 is inserted between the dual wheels, the rotatable support bar 38 is pivoted into an interlocked posture with opposed wheel apertures 48, which are always in registration with each other, pressure hose 44 is connected in conventional manner at valve -46 to tool 34, and pulses of pressurized air are then directed to the resiliently biased impulse piston 42, which in turn fires the chisel member 40 into the V-shaped space where the dual wheels join together to break them apart.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A wheel caddy apparatus for maneuvering a heavy vehicle wheel mounted tire comprising:
   a cart frame;
   a tilt frame pivotally mounted on the cart frame;
   a lift carriage slideably mounted to the tilt frame, and having a carriage shelf, a carriage backplate, and backplate slots;
   a lift carriage lifting and lowering mechanism;
   slot roller pins attached to the tilt frame and in slidable engagement with the back plate slots to allow substantially vertical movement of the lift carriage; and
   roller bearings in the carriage shelf to facilitate mounting tire and wheel onto an axle.

2. The apparatus of claim 1 wherein the cart frame comprises:
   a frame base;
   handle members extending upwardly from the frame base;
   a handle members cross strut; and
   a plurality of wheels rotationally mounted on the frame base.

3. The apparatus of claim 2 further comprising:
   first and second frame trusses extending between the frame base and each handle member; and
   a stop bar.

4. The apparatus of claim 3 wherein the tilt frame includes:
   a substantially horizontally mounted tilt frame pivot bar attached to a forward end of the frame base; and
   a tilt frame cross bar handle to move the tilt frame from a substantially vertical position in contact with the stop bar to a canted position, and back.

5. The apparatus of claim 1 which further comprises shelf lips at lateral edges of the carriage shelf.

6. The apparatus of claim 1, wherein the lift carriage lifting and lowering mechanism comprises:
   a hydraulic pump attached to one of the handle members;
   a resiliently biased pump lever in proximity to one handle member for squeezing toward the handle member to operate the hydraulic pump;
   a hydraulic cylinder attached to the lift carriage; and
   a hydraulic cylinder piston rod pivotally attached to the frame base, such that operation of the hydraulic pump causes the piston rod to bear against the frame base and to elevate the lift carriage relative to the cart frame.

7. The apparatus of claim 1, further comprising a single wheel divorcer tool for breaking a wheel free from a brake drum of a vehicle axle comprising:
   a wheel hook to engage a vehicle wheel; and
   a ramming piston selectively movable relative to the wheel hook to come in selective contact with the brake drum.

8. A wheel caddy apparatus for maneuvering a heavy vehicle wheel mounted tire comprising:
   a cart frame having a frame base, handle members extending upwardly from the frame base, a handle members cross strut, frame trusses extending between the frame base and each handle member, a stop bar, and a plurality of wheels rotationally mounted on the frame base;
   a tilt frame including a substantially horizontally mounted tilt frame pivot bar attached to a forward end of the frame base, and a tilt frame cross bar handle to move the tilt frame from a substantially vertical position in contact with the stop bar to a canted position, and back;
   a lift carriage including a carriage shelf, a carriage back plate and back plate slots for slidable movement of the lift carriage with respect to the tilt frame in cooperation with slot roller pins attached to the tilt frame;
   a lift carriage lifting and lowering mechanism; a
   roller bearings in the carriage shelf to facilitate mounting tire and wheel onto an axle.

9. The apparatus of claim 8, wherein the lift carriage lifting and lowering mechanism comprises:
   a hydraulic pump attached to one of the handle members;
   a resiliently biased pump lever in proximity to one handle member for squeezing toward the handle member to operate the hydraulic pump;
   a hydraulic cylinder attached to the lift carriage; and
   a hydraulic cylinder piston rod pivotally attached to the frame base, such that operation of the hydraulic pump causes the piston rod to bear against the frame base and to elevate the lift carriage relative to the cart frame.

10. The apparatus of claim 8 which further comprises shelf lips at lateral edges of the carriage shelf.

* * * * *